United States Patent
Gundam et al.

(10) Patent No.: US 9,075,927 B2
(45) Date of Patent: Jul. 7, 2015

(54) ASSERTING PHYSICAL PRESENCE TO A TRUSTED PLATFORM MODULE BY PHYSICALLY CONNECTING OR DISCONNECTING A HOT PLUGGABLE DEVICE

(71) Applicant: International Business Machines Corporation, Armonk, NY (US)

(72) Inventors: Raghuswamyreddy Gundam, Austin, TX (US); Newton P. Liu, Austin, TX (US); Douglas W. Oliver, Round Rock, TX (US); Nicholas A. Ramirez, Austin, TX (US); Mehul M. Shah, Austin, TX (US); Wingcheung Tam, Austin, TX (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 122 days.

(21) Appl. No.: 14/016,375

(22) Filed: Sep. 3, 2013

(65) Prior Publication Data
US 2015/0067896 A1    Mar. 5, 2015

Related U.S. Application Data

(63) Continuation of application No. 14/013,799, filed on Aug. 29, 2013.

(51) Int. Cl.
*G06F 13/40* (2006.01)
*G06F 11/30* (2006.01)
(Continued)

(52) U.S. Cl.
CPC ............ *G06F 13/4081* (2013.01); *G06F 21/85* (2013.01); *G06F 21/82* (2013.01); *G06F 9/4411* (2013.01); *G06F 11/3051* (2013.01); *G06F 21/71* (2013.01)

(58) Field of Classification Search
CPC ................. G06F 21/57–21/577; G06F 21/82; G06F 21/85; G06F 13/4081; G06F 9/4411

USPC .......................................... 713/189; 710/302
See application file for complete search history.

(56) References Cited

U.S. PATENT DOCUMENTS 6,697,073 B1 * 2/2004 Kadota ......................... 345/501
7,222,062 B2 * 5/2007 Goud et al. .................... 703/23
(Continued)

FOREIGN PATENT DOCUMENTS

| CN | 1479214 A | 3/2004 |
|---|---|---|
| EP | 2045749 A2 | 4/2009 |

(Continued)

OTHER PUBLICATIONS

Kawai, E. et al "Presence Information Distribution System" English Abstract of JP2006244100A—Hitachi Ltd, Sep. 14, 2006, 17 pages.
(Continued)

*Primary Examiner* — Brian Misiura
(74) *Attorney, Agent, or Firm* — Katherine S. Brown; Jeffrey L. Streets

(57) ABSTRACT

A method includes asserting a physical presence signal to a trusted platform module of a compute node in response to detecting a change in the physical connection of a hot pluggable device to a port of the compute node. The change in the physical connection of the hot pluggable device to the port is selected from physically connecting the hot pluggable device to the port, physically disconnecting the hot pluggable device from the port, and combinations thereof. Optionally, the compute node has a USB port and the hot pluggable device has a USB connector that is selectively physically connectable to the USB port. In one example, detecting a change in the physical connection of the hot pluggable device to the compute node includes detecting a voltage change on the USB port.

20 Claims, 4 Drawing Sheets

(51) Int. Cl.
  *G06F 21/71* (2013.01)
  *G06F 21/85* (2013.01)
  *G06F 21/82* (2013.01)
  *G06F 9/44* (2006.01)

(56) References Cited

U.S. PATENT DOCUMENTS

| | | | |
|---|---|---|---|
| 7,269,747 B2 | 9/2007 | Catherman et al. | |
| 7,788,717 B2 * | 8/2010 | Merkin | 726/18 |
| 7,791,894 B2 * | 9/2010 | Bechtolsheim | 361/752 |
| 7,900,058 B2 * | 3/2011 | Mabayoje et al. | 713/189 |
| 7,949,874 B2 | 5/2011 | Lewis et al. | |
| 8,011,013 B2 | 8/2011 | Bacastow | |
| 8,214,653 B1 * | 7/2012 | Marr et al. | 713/189 |
| 8,294,601 B2 | 10/2012 | Werner et al. | |
| 8,667,263 B2 * | 3/2014 | Challener et al. | 713/2 |
| 8,812,406 B2 * | 8/2014 | Bhola et al. | 705/319 |
| 8,868,898 B1 * | 10/2014 | Van Hoof | 713/2 |
| 8,869,308 B2 * | 10/2014 | Soffer | 726/34 |
| 2002/0104006 A1 | 8/2002 | Boate et al. | |
| 2010/0024001 A1 * | 1/2010 | Campbell et al. | 726/2 |
| 2010/0043060 A1 | 2/2010 | Reuzel et al. | |
| 2010/0066821 A1 | 3/2010 | Rosener et al. | |
| 2010/0218206 A1 | 8/2010 | Biemans | |
| 2011/0314201 A1 | 12/2011 | Su et al. | |

FOREIGN PATENT DOCUMENTS

| | | |
|---|---|---|
| EP | 1691252 B1 | 9/2010 |
| JP | 2006244100 A | 9/2006 |
| WO | WO2009149963 A1 | 12/2009 |
| WO | WO2015278969 A1 | 3/2015 |

OTHER PUBLICATIONS

F. Javier Thayer et al, "Metric Strand Spaces for Locale Authentication Protocols" Trust Management IV IFIP Advances in Information and Communication Technology, vol. 321, pp. 79-94, 2010. (This document only identifies the year of publication (without the month), but the year of publication is sufficiently earlier than the effective U.S. filing date and any foreign priority date so that the particular month of publication is not in issue. See MPEP 609.04(a)).

Yu, Bai, "PCT/CN20141085006 PCT International Search Report and Written Opinion" Date of mailing: Nov. 12, 2014, International Application No. PCT/CN2014/085006, 12 pages. (This PCT application is related to the present U.S. Appl. No. 14/016,375).

\* cited by examiner

ASSERTING PHYSICAL PRESENCE TO A TRUSTED PLATFORM MODULE BY PHYSICALLY CONNECTING OR DISCONNECTING A HOT PLUGGABLE DEVICE

CROSS-REFERENCE TO RELATED APPLICATIONS

This application in a continuation co-pending U.S. patent application Ser. No. 14/013,799, filed on Aug. 29, 2013.

BACKGROUND

1. Field of the Invention

The present invention relates to systems having a trusted platform module, and methods of asserting physical presence to a trusted platform module.

2. Background of the Related Art

A Trusted Platform Module (TPM) is a microcontroller that stores keys, passwords and digital certificates. A TPM is typically installed on the motherboard of a computer or any computing device that requires these functions. The nature of this microcontroller ensures that the information stored on the computer is made more secure from external software attack and physical theft. Security processes, such as digital signature and key exchange, are protected by the TPM. For example, the TPM may deny access to data and secrets in a platform if the boot sequence is not as expected. Critical applications and capabilities such as secure email, secure web access and local protection of data are thereby made much more secure.

BRIEF SUMMARY

One embodiment of the present invention provides a method that comprises asserting a physical presence signal to a trusted platform module of a compute node in response to detecting a change in the physical connection of a hot pluggable device to a port of the compute node, wherein the change in the physical connection of the hot pluggable device to the port is selected from physically connecting the hot pluggable device to the port, physically disconnecting the hot pluggable device from the port, and combinations thereof.

DETAILED DESCRIPTION

Figure 1:
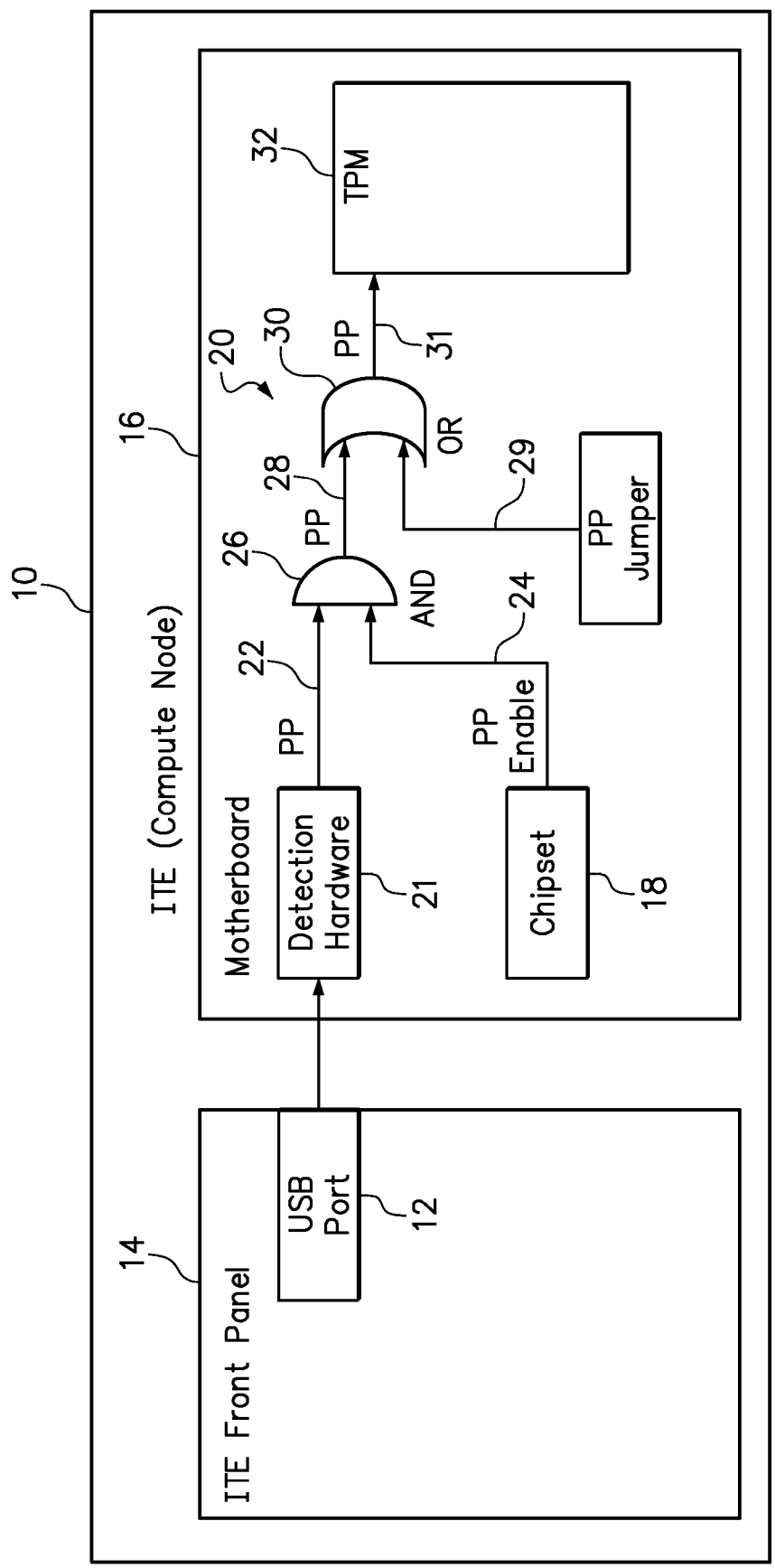
FIG. 1 is a diagram of a compute node including a circuit for asserting physical presence to a trusted platform module in response to detecting physical presence of a USB device in a USB port of the compute node.

One embodiment of the present invention provides a method that comprises asserting a physical presence signal to a trusted platform module of a compute node in response to detecting a change in the physical connection of a hot pluggable device to a port of the compute node, wherein the change in the physical connection of the hot pluggable device to the port is selected from physically connecting the hot pluggable device to the port, physically disconnecting the hot pluggable device from the port, and combinations thereof.

The hot pluggable device may be of any type or have any plug configuration. However, the hot pluggable device is preferably easily accessible to a user for manually grasping the hot pluggable device to physically connect and physically disconnect the device. Most preferably, the port of the compute node may be externally accessible, such as being exposed on a front panel of the compute node. Furthermore, the compute node may be a narrow blade installed in a multi-blade chassis. For example, the front panel of an ITE (information technology equipment) or compute node may have little more than a power button and one or more port. According to embodiments of the present invention, a port, rather than a button, may be used to cause the assertion of physical presence. Furthermore, embodiments of the present invention can assert physical presence without requiring, as in some existing compute nodes, the user to remove the node from a chassis, open up the node, and toggle a switch or jumper within the node.

In one non-limiting example, the compute node has a USB port and the hot pluggable device has a USB connector that is physically connectable to the USB port and physically disconnectable from the USB port. Any of a variety of common hot pluggable USB devices may be used in this manner, such as a USB flash drive (also know as a thumb drive) or a hard disk drive. In accordance with the present invention, the specific functionality of the hot pluggable device is unimportant.

In another embodiment, a change in the physical connection of the hot pluggable device to the compute node may be detected by detecting a voltage change on the port of the compute node. An electrical connection between the hot pluggable device and the port allows a circuit within the compute node to detect the voltage change. Specifically, the circuit may detect a voltage change when a previously unconnected hot pluggable device is connected to the port and may also detect a voltage change when a connected hot pluggable device is disconnected from the port.

Optionally, the physical presence signal may be asserted to the trusted platform module of the compute node in response to detecting at least a predetermined number of changes (two or more) in the physical connection of the hot pluggable device to the compute node within a predetermined period of time. In order to cause the predetermined number of changes in the physical connection, it is necessary to use some combination of connecting and disconnecting the hot pluggable device to/from the port of the compute node. As a non-limiting example, if the assertion of physical presence requires three changes in the physical connection within a period of five seconds, then a user may physically handle a USB flash drive and, within the five second predetermined period: (1) connect the USB flash drive to a USB port, (2) disconnect the USB flash drive from the USB port, and (3) reconnect the USB flash drive to the USB port. Alternatively, but within the same non-limiting example, a USB flash drive that is already connected to the USB port may be physically handled to assert physical presence by, within the five second predetermined period: (1) disconnect the USB flash drive from the USB port, (2) reconnect the USB flash drive to the USB port, and (3) again disconnect the USB flash drive from the USB port. In a further option, the physical presence signal may be asserted to the trusted platform module of the compute node in response to detecting a plurality of changes in the physical connection of the hot pluggable device to the compute node occurring in a predetermined pattern.

In yet another embodiment, additional conditions are required to be met before asserting a physical presence signal to a trusted platform module of a compute node. For example, a physical presence signal may be asserted to a trusted platform module of a compute node in response to: (a) detecting a change in the physical connection of the hot pluggable device to the compute node; and (b) enabling the physical presence signal through a software interface of the compute node. Requiring multiple conditions, such as these two conditions, provides greater security against inadvertently asserting physical presence. In this example, a user accidentally connecting, disconnecting and reconnecting a USB flash drive would not be sufficient to assert physical presence. Rather, a user with proper authorization may log into a software interface, such as an interface for maintaining TPM settings, and enable the physical presence signal (perhaps enabled for a predetermined time period) just prior to connecting, disconnecting and reconnecting a USB flash drive (i.e., causing three voltage changes in less than five seconds per the earlier non-limiting example).

In a further embodiment, the method may allow modification of one or more settings of the compute node during a predetermined time period following the assertion of the physical presence signal. Alternatively, the method may allow modification of one or more settings of the compute node if the physical assertion signal is asserted within a predetermined time period after requesting modification of the one or more settings. For example, the one or more settings may affect the operation of the trusted platform module. One non-limiting example of a setting that may be protected by physical presence is the Secure Boot feature. When enabled, Secure Boot only boots an operating system (OS) whose boot loader has been signed by a key from the operating system developer, such as Microsoft Corporation. Therefore, the physical presence assertion of the present invention may be used to protect against malicious hackers from disabling the Secure Boot feature.

Another embodiment of the present invention provides a computer program product including computer readable program code embodied on a computer readable storage medium. The computer program product comprises computer readable program code for asserting a physical presence signal to a trusted platform module of a compute node in response to detecting a change in the physical connection of a hot pluggable device to the compute node, wherein the change in the physical connection of the hot pluggable device to the port is selected from physically connecting the hot pluggable device to the port, physically disconnecting the hot pluggable device from the port, and combinations thereof.

The foregoing computer program product may further include computer readable program code for implementing or initiating any one or more aspects of the methods described herein. Accordingly, a separate description of the methods will not be duplicated in the context of a computer program product.

A further embodiment of the present invention provides a compute node comprising a motherboard having a trusted platform module, and a port for selectively coupling a hot pluggable device into communication with the motherboard. The compute node further comprises a circuit coupled to the port for detecting a change in the physical connection of the hot pluggable device to the port and for asserting a physical presence signal to the trusted platform module in response to detecting a change in the physical connection of the hot pluggable device to the port, wherein the change in the physical connection of the hot pluggable device to the port is selected from physically connecting the hot pluggable device to the port, physically disconnecting the hot pluggable device from the port, and combinations thereof.

FIG. 1 is a diagram of a compute node 10 including a circuit 20 for asserting physical presence (PP) to a trusted platform module 32 in response to detecting physical presence of a USB device (not shown) in a USB port 12 in the front panel 14 of the compute node 10. The USB port 12 provides physical support and electronic connections that allow USB device (or other hot pluggable device) to communicate with components on the motherboard 16.

The circuit 20 includes detection hardware 21 coupled to the port 12 for detecting a change in the physical connection of the hot pluggable device to the port 12 and for asserting a physical presence (PP) signal to the trusted platform module 32 in response to detecting a change in the physical connection of the hot pluggable device to the port 12. As shown, the circuit 20 generates a detection signal 22 in response to the detecting the change in the physical connection, wherein the circuit is also coupled to a chipset 18 for receiving an enable signal 24, and wherein the circuit 20 includes an AND gate 26 receiving the enable signal and the detection signal and outputting the physical presence signal to the trusted platform module 32. The circuit 20 further includes an OR gate 30 receiving the physical presence signal 28 and a physical jumper detection signal 29, and wherein the output of the OR gate is coupled to the trusted platform module 32 for providing a physical presence signal 31 to the TPM 32. The utility of the OR gate 30 is to allow a user to assert physical presence either using the present methods of connecting/disconnecting a hot pluggable device to the port 12 or using the method of toggling or positioning a jumper inside the enclosure of the compute node 10.

Figure 2A:
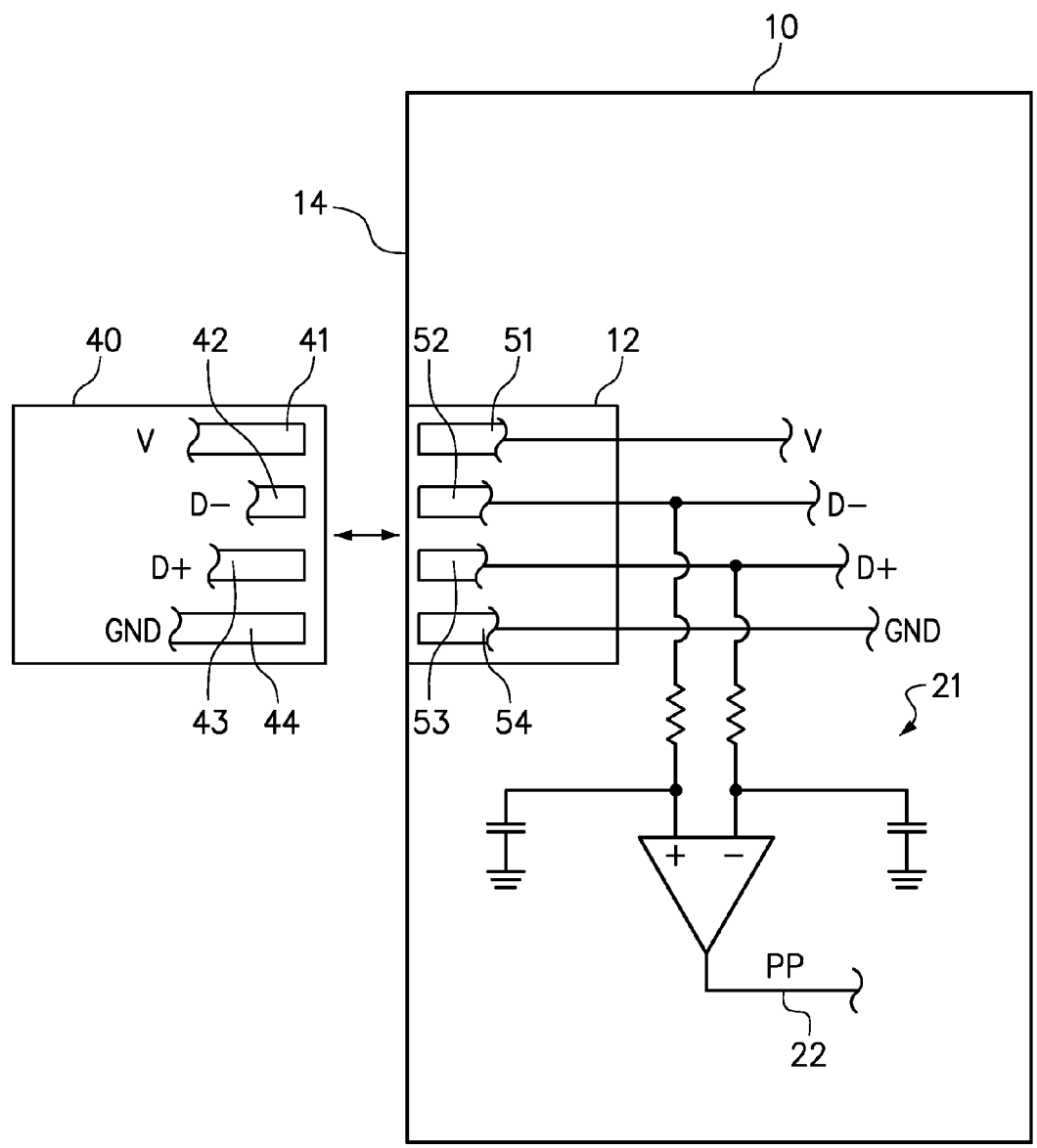
FIG. 2A is a diagram of a USB device that is physically disconnected from the USB port of the compute node.

FIG. 2A is a diagram of a USB device 40 that is physically disconnected from the USB port 12 of the compute node 10. According to one configuration of a Universal Serial Bus, the USB device 40 and USB port 12 having four aligned conductors—a voltage line 41, 51, a first data line (D–) 42, 52, a second data line (D+) 43, 53, and a ground line 44, 54. The compute node 10 includes detection hardware or comparison circuit 21 that compares the voltages on the D+ and D– lines 52, 53 to generate the physical presence signal 22. It should be understood that PP signal 22 may be coupled to the AND gate 26 as in FIG. 1.

Figure 2B:
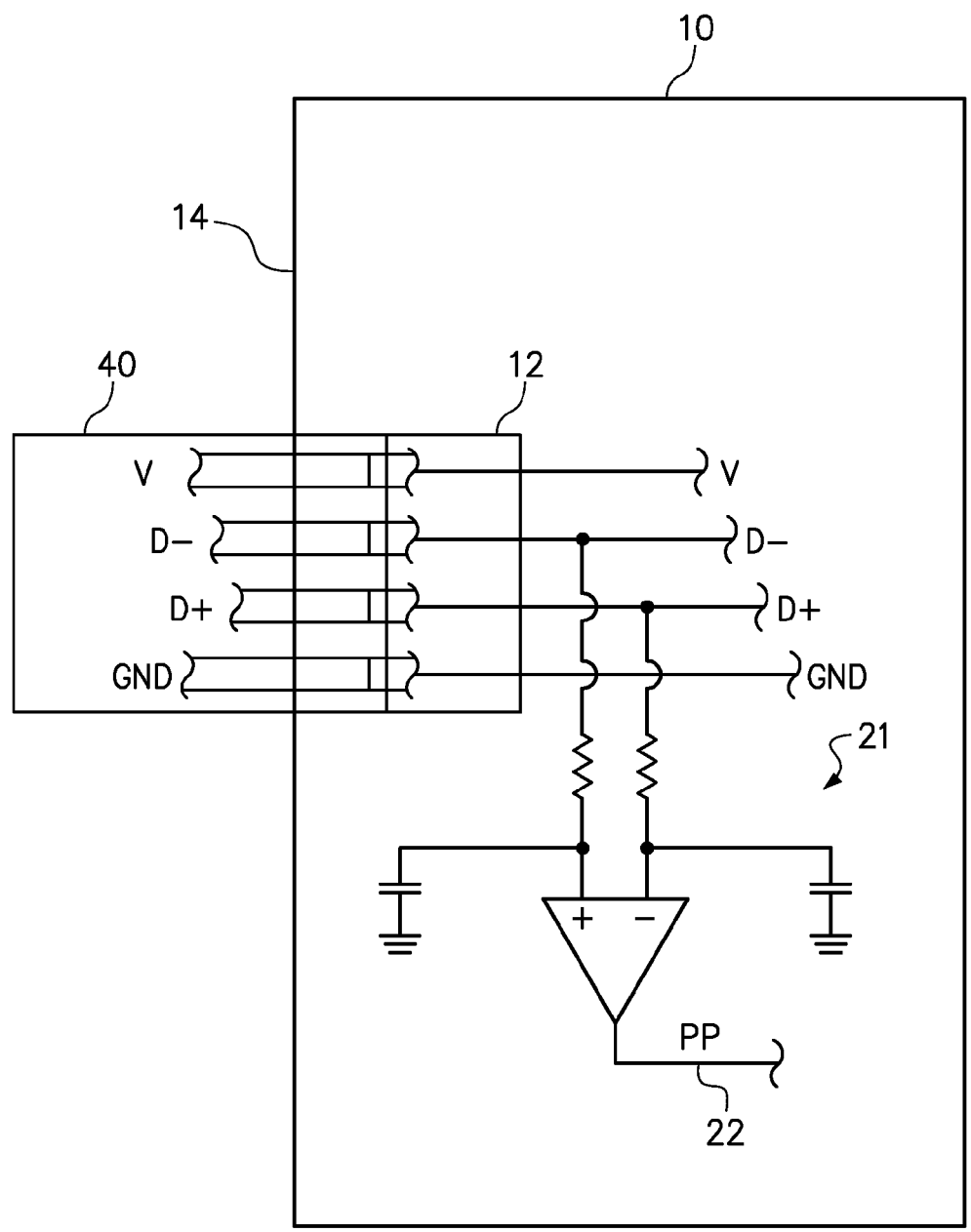
FIG. 2B is a diagram of a USB device that is physically connected to the USB port of the compute node.

FIG. 2B is a diagram of the USB device 40 when it is physically connected to the USB port 12 of the compute node 10. When physically connected as shown, the conductors 41-44 of the hot pluggable USB device 40 are electronically coupled to the conductors 51-54 of the port 50.

Referring to both FIG. 2A and FIG. 2B, it can be seen that a change in the physical connection of the hot pluggable device 40 to the port 12 can be selected from physically connecting the hot pluggable device to the port (moving the hot pluggable device from the position in FIG. 2A to the position in FIG. 2B), physically disconnecting the hot pluggable device from the port (moving the hot pluggable device from the position in FIG. 2B to the position in FIG. 2A), and combinations thereof. The circuit 21 is able to detect both of these changes in the physical connection of the hot pluggable device 40 to the compute node 10 by detecting a voltage change on the port 12.

Figure 3:
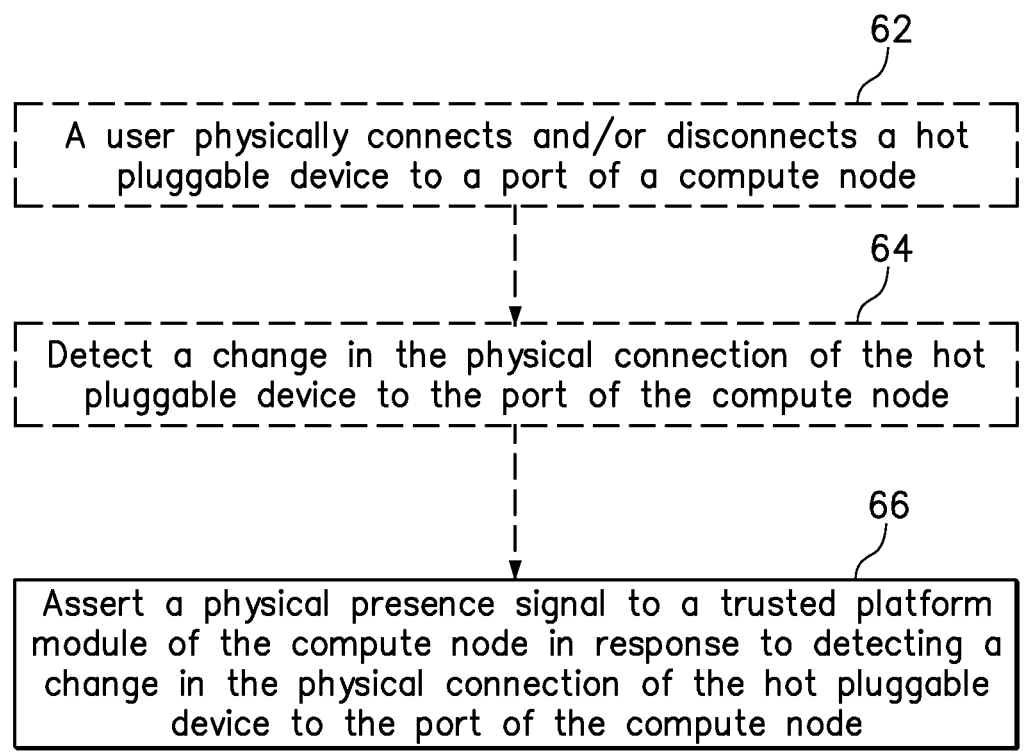
FIG. 3 is a flowchart of a method that includes asserting physical presence in a compute node having a trusted platform module.

FIG. 3 is a flowchart of a method that includes asserting physical presence in a compute node having a trusted platform module. As shown in box 62, a user physically connects and/or disconnects a hot pluggable device to a port of a compute node. As shown in box 64, a change in the physical connection of the hot pluggable device to the port of the compute node is detected. Then, in step 66, the method asserts a physical presence signal to a trusted platform module of the compute node in response to detecting a change in the physical connection of the hot pluggable device to the port of the compute node.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    asserting a physical presence signal to a trusted platform module of a compute node in response to detecting a change in the physical connection of a hot pluggable device to a port of the compute node, wherein the change in the physical connection of the hot pluggable device to the port is selected from physically connecting the hot pluggable device to the port, physically disconnecting the hot pluggable device from the port, and combinations thereof; and
    allowing modification of one or more settings of the compute node during a predetermined period following the assertion of the physical presence signal.

2. The method of claim 1, wherein the port is a USB port and the hot pluggable device has a USB connector that is selectively physically connectable to the USB port.

3. The method of claim 2, wherein detecting a change in the physical connection of the hot pluggable device to the compute node includes detecting a voltage change on the USB port.

4. The method of claim 2, wherein the compute node is a blade installed in a multi-blade chassis.

5. The method of claim 1, wherein the hot pluggable device is a hard disk drive.

6. The method of claim 1, wherein the one or more settings affect the operation of the trusted platform module.

7. A method, comprising:
    asserting a physical presence signal to a trusted platform module of a compute node in response to detecting a change in the physical connection of a hot pluggable device to a port of the compute node, wherein the change in the physical connection of the hot pluggable device to the port is selected from physically connecting the hot pluggable device to the port, physically disconnecting the hot pluggable device from the port, and combinations thereof, wherein asserting a physical presence signal to a trusted platform module of a compute node in response to detecting a change in the physical connection of a hot pluggable device to the compute node, includes:
        asserting a physical presence signal to a trusted platform module of a compute node in response to:
            detecting a change in the physical connection of the hot pluggable device to the compute node; and
            enabling the physical presence signal through a software interface of the compute node.

8. A method, comprising:
    asserting a physical presence signal to a trusted platform module of a compute node in response to detecting a change in the physical connection of a hot pluggable device to a port of the compute node, wherein the change in the physical connection of the hot pluggable device to the port is selected from physically connecting the hot pluggable device to the port, physically disconnecting the hot pluggable device from the port, and combinations thereof, wherein asserting a physical presence signal to a trusted platform module of a compute node in response to detecting a change in the physical connection of a hot pluggable device to the compute node, includes:
        asserting a physical presence signal to a trusted platform module of a compute node in response to detecting at least a predetermined number of changes in the physical connection of the hot pluggable device to the compute node within a predetermined period of time, wherein the predetermined number is two or more.

9. A method, comprising:
    asserting a physical presence signal to a trusted platform module of a compute node in response to detecting a change in the physical connection of a hot pluggable device to a port of the compute node, wherein the change in the physical connection of the hot pluggable device to the port is selected from physically connecting the hot pluggable device to the port, physically disconnecting the hot pluggable device from the port, and combinations thereof, wherein asserting a physical presence signal to a trusted platform module of a compute node in response to detecting a change in the physical connection of a hot pluggable device to the compute node, includes:
        asserting a physical presence signal to a trusted platform module of a compute node in response to detecting a plurality of changes in the physical connection of the hot pluggable device to the compute node occurring in a predetermined pattern.

10. The method of claim 7, further comprising:
    allowing modification of one or more settings of the compute node during a predetermined period following the assertion of the physical presence signal.

11. The method of claim 10, wherein the one or more settings affect the operation of the trusted platform module.

12. The method of claim 7, wherein the port is a USB port and the hot pluggable device has a USB connector that is selectively physically connectable to the USB port.

13. The method of claim 12, wherein detecting a change in the physical connection of the hot pluggable device to the compute node includes detecting a voltage change on the USB port.

14. The method of claim 8, further comprising:
    allowing modification of one or more settings of the compute node during a predetermined period following the assertion of the physical presence signal.

15. The method of claim 14, wherein the one or more settings affect the operation of the trusted platform module.

16. The method of claim 8, wherein the port is a USB port and the hot pluggable device has a USB connector that is selectively physically connectable to the USB port.

17. The method of claim 16, wherein detecting a change in the physical connection of the hot pluggable device to the compute node includes detecting a voltage change on the USB port.

18. The method of claim 9, further comprising:
allowing modification of one or more settings of the compute node during a predetermined period following the assertion of the physical presence signal.

19. The method of claim 9, wherein the port is a USB port and the hot pluggable device has a USB connector that is selectively physically connectable to the USB port.

20. The method of claim 19, wherein detecting a change in the physical connection of the hot pluggable device to the compute node includes detecting a voltage change on the USB port.

* * * * *